United States Patent [19]

Aizawa et al.

[11] Patent Number: 5,547,510
[45] Date of Patent: Aug. 20, 1996

[54] COATING APPARATUS

[75] Inventors: Hiroyuki Aizawa; Seiichi Tobisawa, both of Hino, Japan

[73] Assignee: Konica Corporation, Japan

[21] Appl. No.: 221,764

[22] Filed: Apr. 1, 1994

[30] Foreign Application Priority Data

Apr. 8, 1993 [JP] Japan .................................. 5-106277

[51] Int. Cl.⁶ .................................. B05C 5/00; B05C 5/02
[52] U.S. Cl. ........................... 118/410; 118/411; 118/419
[58] Field of Search .................................. 118/410, 411, 118/419; 425/461, 113; 427/356, 419.3

[56] References Cited

U.S. PATENT DOCUMENTS

| | | | |
|---|---|---|---|
| 5,042,422 | 8/1991 | Tobisawa et al. | 118/410 |
| 5,083,524 | 1/1992 | Hiraki et al. | 118/419 |
| 5,097,792 | 3/1992 | Umemura et al. | 118/411 |
| 5,186,754 | 2/1993 | Umemura et al. | 118/411 |
| 5,336,322 | 9/1994 | Tobisawa et al. | 118/410 |

FOREIGN PATENT DOCUMENTS 2-207865  8/1990  Japan .

*Primary Examiner*—Brenda A. Lamb
*Attorney, Agent, or Firm*—Jordan B. Bierman; Bierman and Muserlian

[57] ABSTRACT

An coating apparatus comprises at least two coating bars along which a support member is conveyed in a running direction, wherein a center line mean roughness (Ra) on the edge at the downstream side of the downstream bar is not larger than 0.5 μm and the maximum height (Rmax) on the edge is not larger than 6.0 μm.

8 Claims, 4 Drawing Sheets

COATING APPARATUS

BACKGROUND OF THE INVENTION

The present invention relates to a coating apparatus for coating uniformly a magnetic coating, a metallic coating or a resin solution or the like on a polyester base or on a sheet-shaped object such as a thin metallic sheet, without any coating defect such as streak defect and uneven and nonuniform coating layer, and more particularly, to a coating apparatus which is used preferably for manufacturing magnetic recording media.

Magnetic recording media are obtained by coating a magnetic coating solution on a support and drying it, and as an apparatus for coating a magnetic coating solution on a support, a roll coater, a gravure coater and an extrusion coater are generally used. In the case of the extrusion coater among them, an excellent coating thickness can be obtained even in the case of high speed coating such as the coating speed of 200 m/min or more or of thin layer coating such as the wet coating thickness of 10 μm or less. However, the extrusion coating has problems that white clearness on a coated layer and streak defects are easily caused.

One of the reasons for these defects is that foreign materials, dust or coagulations stick to an edge surface (hereinafter referred to as a back edge surface) positioned at the extremely downstream side of the extrusion coater during coating. As disclosed in Japanese Patent Publication Open to Public Inspection Nos. 207865/1990 and 207866/1990, therefore, there are suggested methods wherein adhesion of extraneous matters on the back edge surface of an extrusion coater is prevented by making the value of center line mean roughness (Ra) on the back edge surface of the extrusion coater small.

Following the densification of magnetic recording media, the coating thickness of a magnetic layer to be coated on a support is required to be thinner in the manufacturing process. Further, the coating speed is in a trend for higher speed from the viewpoint of productivity, and thereby, enough time for leveling can not be given to a coating solution, thus, the suggestion disclosed in the aforementioned official documents, namely, only to make the value of center line mean roughness on the back edge surface of the extrusion coater small has become insufficient for preventing coating defects such as uneven and nonuniform coating layer and streak defects.

SUMMARY OF THE INVENTION

The present inventors found from experiments that the surface conditions at a solution-releasing position on a bar (hereinafter referred to as a back bar) located on the extremely downstream side of an extrusion coater is closely connected to coating defects such as uneven and nonuniform coating layer, white non-coating defects on a coated layer and streak defects, and completed the invention successfully by paying attention especially to that the solution-leaving point locates at the position near the edge on the downstream side of the back bar. Namely, an object of the invention is to provide an improved coating apparatus which causes neither uneven and nonuniform coating layer nor streak defects in general coating even under the conditions of high speed coating and thin layer coating, especially to provide a coating apparatus which is suitable for manufacturing magnetic recording media.

In a coating apparatus comprising at least two bars and a coating-solution-extrusion outlet located between the above-mentioned bars, wherein a back bar which is one of the above-mentioned two bars and is located at the extremely downstream side in the running direction of a support is provided with an edge surface, the object of the invention mentioned above can be achieved by the coating apparatus wherein the center line mean roughness (Ra) on the edge at the downstream side of the back bar mentioned above is not larger than 0.5 μm and maximum height (Rmax) is not larger than 6.0 μm.

Further, following the recent trend for a thinner coating thickness, surface characteristics of a coated layer are required to be better, thus, it is preferable that the center line mean roughness (Ra) on the edge located at the downstream side on the back bar is not larger than 0.35 μm, and it is more preferable that it is not larger than 0.1 μm. Further, it is preferable that the maximum height (Rmax) is not larfer than 4.0 μm and it is more preferable that it is not larger tnan 1.2 μm. It was found that the value of center line mean roughness (Ra) on the edge at the downstream side on the back bar contributes greatly to uneven and nonuniform coating layer and the value of the maximum height (Rmax) contributes greatly to streak defects, thus excellent coated layers can be obtained by the combination of appropriate values of both the mean roughness and the maximum height.

Further, it is preferable that the center line mean roughness (Ra) on the portion within a range of 2.0 mm from the edge at the downstream side of the aforesaid back bar on the surface following the edge at the downstream side on the back bar is not larger than 0.5 μm and the maximum height (Rmax) is not larger than 6.0 μm.

The edge surface in this case means a surface which is ahead of or behind the aforesaid coating-solution-extrusion outlet and faces a support member to be coated with coating solution when coating. The edge at the downstream side of the back bar means a position located at the boundary between edge surface R of back bar B and surface L following the edge at the downstream side of back bar B and is formed to be an apex with the surface R and surface L in FIG. 2 which is an enlarged sectional view of the Y-Z plane of the back bar B in FIG. 1. Since the apex exists only conceptually, area A on the back bar B within 100 μm from intersecting point K where approximate curve T of a sectional view of the surface R and approximate straight line (approximate curve when the surface L shows a curve) U of a sectional view of the surface L intersect each other is defined as an edge in the invention. Incidentally, the distance from the edge at the downstream side of the back bar means the distance from the intersecting point K.

The center line mean roughness (Ra) on the edge at the downstream side of the back bar and the maximum height (Rmax) are formed through grinding on edge surface R of the back bar and grinding on surface L following the edge at the downstream side of the back bar. For example, when the surface R is subjected to a front grinding method and the surface L is subjected to a side grinding method both as grinding processing, both of the center line mean roughness (Ra) and the maximum height (Rmax) on the edge differ from measurement values of those on the surface R and surface L, showing the values on the edge composed by the grinding of the surface R and surface L.

As an extrusion coater to be used for coating, those disclosed in FIG. 1 on page 4 of Japanese Patent Publication Open to Public Inspection No. 184072/1989 (hereinafter referred to as Japanese Patent O.P.I. Publication), disclosed in FIG. 1 on page 6 of Japanese Patent O.P.I. Publication No. 251265/1990 and disclosed in FIG. 3 on page 6 of Japanese Patent O.P.I. Publication No. 268862/1990 are given, provided, however that the invention is not limited only to those mentioned above.

The present invention relates to a coating apparatus used preferably for manufacturing magnetic recording media, and it is preferable that those disclosed in paragraph [0029] on page 3—paragraph [0052] on page 4 of Japanese Patent O.P.I. Publication No. 313811/1992 are used as magnetic particles, those disclosed in the 10th line in the lower column on the right side on page 3—the 15th line in the upper column on the left side on page 4 of Japanese Patent O.P.I. Publication No. 62311/1991 are used as a linking or binding agent and those disclosed in 12th–20th line in the upper column on the right side of Japanese Patent O.P.I. Publication No. 16015/1992 are used as a dispersing agent, all in the formula of a coating solution to be used.

In the actual coating, as shown in FIGS. 3, 4 and 5, when the direction toward support S to be coated thereon from tangent line T' on intersecting point K of approximate curve T is defined to be a positive direction, coating can be performed with angle θ which is formed between the tangent line T' and the support S and ranges from −10° to +30°, but the range making it possible to obtain a uniform coated layer is restricted and the value of the upper limit of the range is lowered as the coating speed rises.

The center line mean roughness (Ra) and the maximum height (Rmax) on the surface L following an edge at the downstream side on back edge surface R start causing uneven and nonuniform coating layer as well as streak defects gradually as the angle θ becomes smaller. The higher the coating speed is, the narrower the angle θ is, and the greater an influence of the surface condition of surface L on a coated layer is.

The center line mean roughness (Ra) in this case means, as defined in JIS B 0601 (1982), the value of Ra indicated in micrometer (μm) which is obtained by the following expression when a portion of measured length l is picked up from a curve of roughness in the direction of its center line, the center line of the portion picked up is defined as X axis, the direction of longitudinal magnification is defined as Y axis, and a roughness curve is expressed by y=f (x):

$$Ra = \frac{1}{l} \int_0^l |f(x)| dx$$

Expression 1

As maximum height (Rmax) is defined in JIS B0601 (1986), means, when a portion (hereinafter referred to as a picked-up portion) is picked up by a reference length from a sectional curve and the picked-up portion is interposed by two straight lines being in parallel with an average line of the picked-up portion, the maximum height (Rmax) means the value expressed in micrometer (μm) obtained by measuring the distance between the above two straight lines in the direction of longitudinal magnification of a sectional curve. As a measuring instrument, a surface roughness tester of a contact type is used and its measuring way is described in The Preferred Embodiment in detail.

DETAILED DESCRIPTION OF THE PREFERRED EMBODIMENTS

An effect of the invention will be exemplified as follows, referring to examples. It is apparent from the object of the invention that the invention can be applied to the items other than magnetic recording media without being limited to the examples shown below.

Composition shown below was used for preparing magnetic coating.

| Magnetic coating | |
|---|---|
| Fe—Al type ferromagnetic metal powder [Hc: 16000 Oe, 120 emu/g average axis length: 220 nm X-ray particle size (average crystal size): 20 μm] | 100 parts |
| Vinyl chloride resin (made by Nihon Zeon Co. MR 110) | 10 parts |
| Metal salt sulfonate-containing polyurethane resin (made by Toyo Boseki Co., UR 8700) | 5 parts |
| α-alumina | 5 parts |
| Carbon black (average particle size 40 μm) | 1 part |
| Myristic acid | 1 part |
| Stearic acid | 1 part |
| Butylstearate | 1 part |
| Methyl ethyl ketone | 100 parts |
| Toluene | 100 parts |
| Cyclohexanone | 100 parts |

Under the composition mentioned above, a solvent was added partially so that the solid concentration may be 80%, 0.2 kw or more of actual load power per 1 kg of magnetic powder was applied for 10 minutes or more for kneading, a mixer such as a high speed homogenizer was used for diluting to obtain the aforesaid prescribed value, a sand mill was used together with zirconia beads having an average particle size of 1.0 mm for dispersing, and finally, polyisocyanate compounds (Coronate L 5 parts) were added for preparing.

Next, composition shown below was used for preparing nonmagnetic coating.

| Nonmagnetic coating | |
|---|---|
| TiO$_2$ (average particle size 15 nm, BET 15 m$^2$/g) | 100 parts |
| Vinyl chloride resin (made by Nihon Zeon Co. MR 110) | 1 part |
| Metal salt sulfonate-containing polyurethane resin (made by Toyo Boseki Co., UR 8700) | 5 parts |

-continued

| Nonmagnetic coating | |
|---|---|
| Myristic acid | 1 part |
| Stearic acid | 1 part |
| Butylstearate | 1 part |
| Methyl ethyl ketone | 35 parts |
| Toluene | 35 parts |
| Cyclohexanone | 35 parts |

Under the composition mentioned above, a solvent was added partially so that 0.2 kw or more of actual load power per 1 kg of magnetic powder may be applied, kneaded for 10 minutes or more, a mixer such as a high speed homogenizer was used for diluting to obtain the aforesaid prescribed value, a sand mill was used together with zirconia beads having an average particle size of 1.0 mm for dispersing, and finally, polyisocyanate compoounds (Coronate L 5 parts) were added for preparing.

Figure 1:
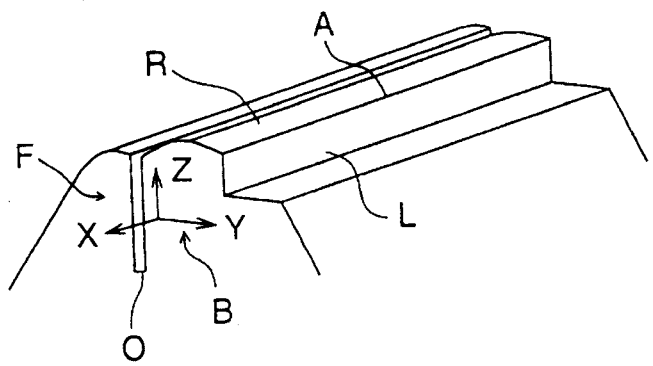
FIG. 1 is a perspective view of an extrusion coater of the invention.
Figure 2:
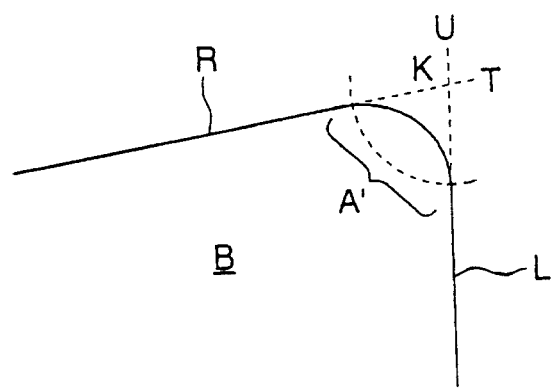
FIG. 2 is a perspective view of an edge located at the downstream side on a back bar of the invention.
Figure 3:
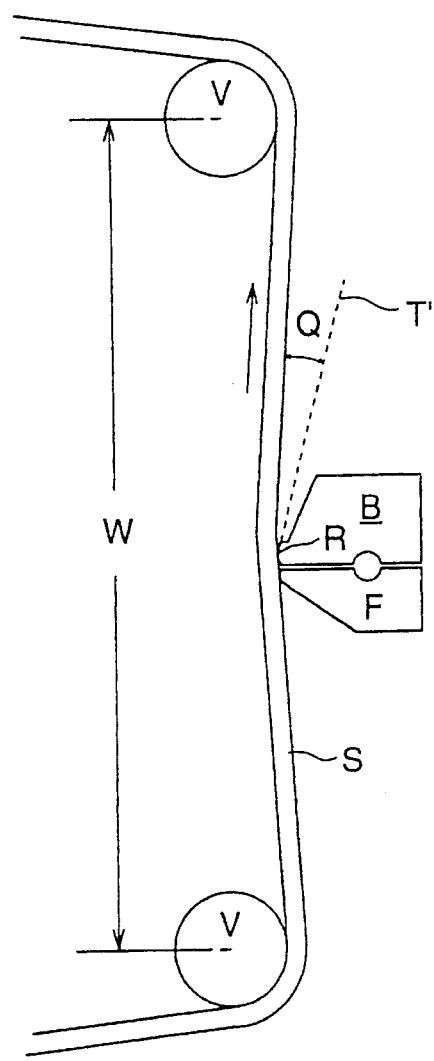
FIG. 3 is a layout diagram showing an extrusion coater and a support roll in the case of coating.
Figure 4:
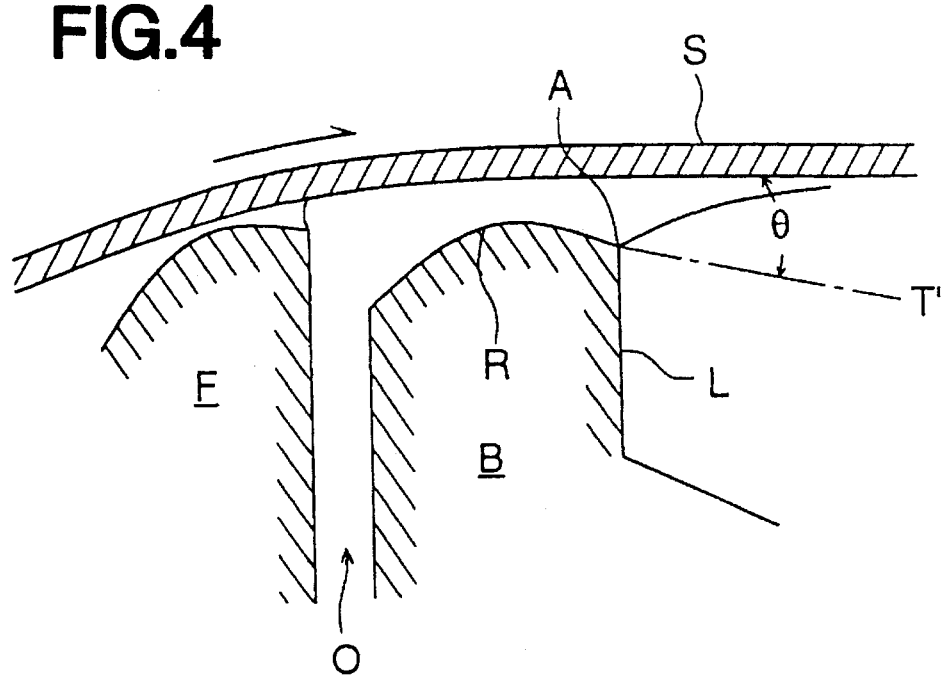
FIG. 4 is a sectional view of a single layer extrusion coater of the invention.
Figure 5:
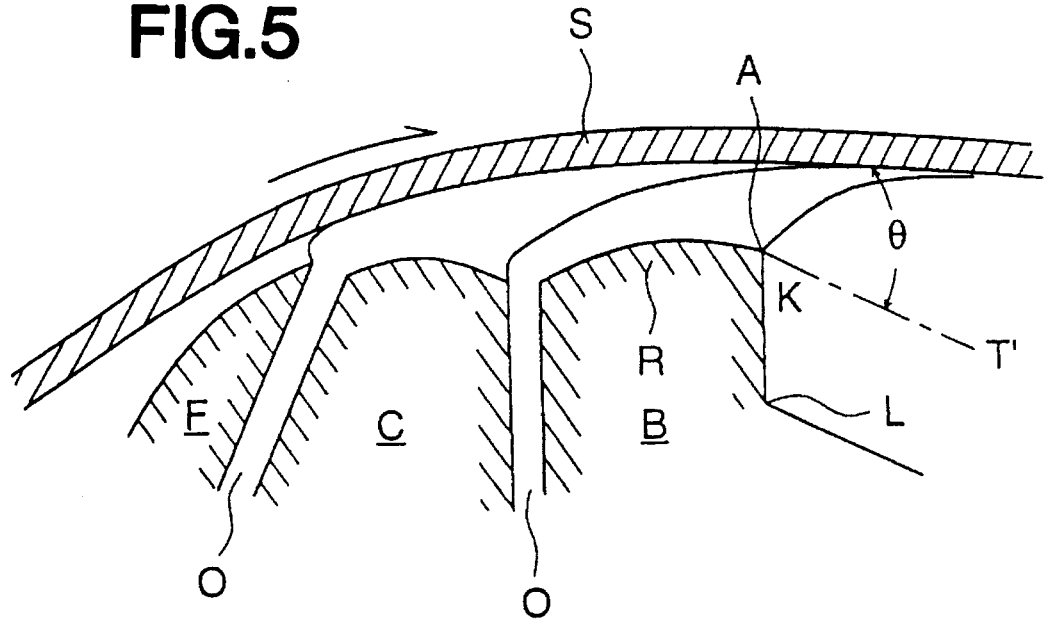
FIG. 5 is a sectional view of a multi-layer extrusion coater of the invention.

Dispersed coating solution thus prepared was coated on a polyethylenephthalate base having a thickness of 8 µm by means of an extrusion coater for a single layer with a width of 450 mm whose sectional view is shown in FIG. 4 and an extrusion coater for multi-layer with a width of 450 mm whose sectional view is shown in FIG. 5. On that occasion, a coating solution-extrusion outlet of the extrusion coater was set at the almost central position between two support rolls each having the span W of 500 mm shown in FIG. 3 and pushed toward the base side so as to be located at a position where excellent coating ability is obtained. The coating was conducted on the position. Tension for conveyance in this case was 15 kg per width.

Evaluation on the video tape was made through the methods shown below.

Uneven and nonuniform coating:

From a video tape slit into 8 mm and having a coating length of 100 m, samples each having a length of 10 m were picked up at arbitrary positions of the video tape. Each sample was cut into 200 pieces in the lengthwise direction at 5 cm intervals, and layer thickness distribution in the lateral direction of each piece was measured by an X-ray layer thickness tester. As a judgment of samples, when even one piece among 200 pieces cut away from a sample shows deviation of ±1% or more of layer thickness against the target thickness of dried coating, the sample was deemed as a defect product and the percentage defective for all samples was calculated.

Streak defect:

By the use of transmitted light, the number of streak defects was counted for the sample having the coating length of 1000 m and width of 400 mm (excluding unnecessary portions at both sides).

C/N ratio

By the use of an 8 mm video recorder (SONY EV09500), a single sine wave of 7 MHz was recorded, the signal therefrom was reproduced, then reproduction output of both 6 MHz and 7 MHz were measured by an output level measuring instrument and a difference between them was indicated in dB.

Figure 6A:
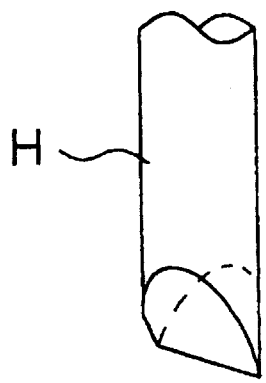
FIG. 6(A) and 6(B) is a perspective view of a stylus of a roughness tester.
Figure 7:
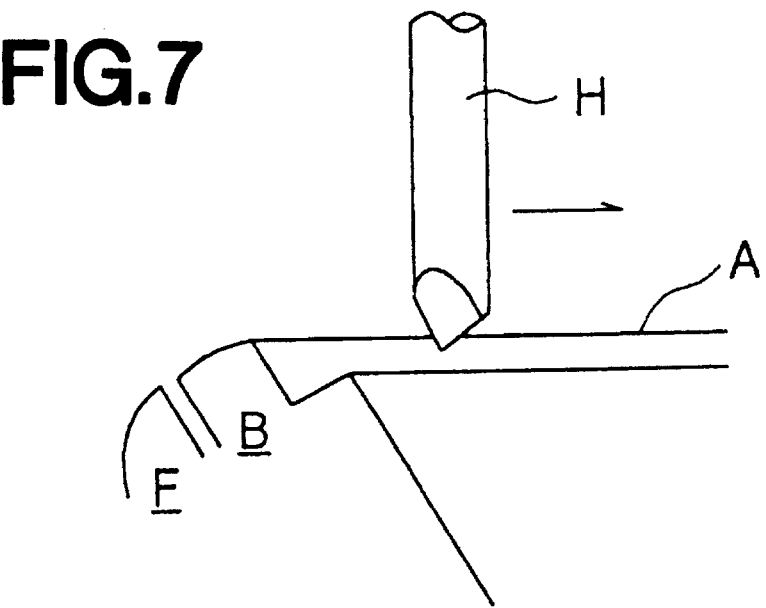
FIG. 7 is a perspective view showing how the stylus of a roughness tester works.
Figure 8:
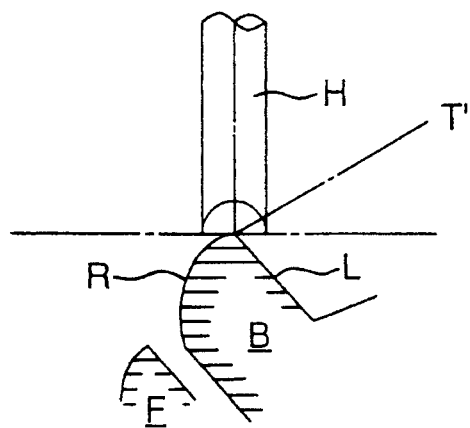
FIG. 8 is a sectional view showing how the stylus of a roughness tester works.

Center line mean roughness (Ra) and maximum height (Rmax):

Three-dimensional surface roughness tester (Form tracer CS-411) made by Mitsutoyo Co. was used for measurement. When measuring an edge located at the downstream side on the back bar, a stylus of a wedge type having a width of 2 mm as shown in FIG. 6(A) was used, and the surface roughness tester mentioned above was set so that an angle formed by the axis of the stylus and tangential line T' may be 80° and the bottom of the stylus became horizontal as shown in FIGS. 7 and 8. Then, area A was measured in the lateral direction of the support.

Figure 6B:
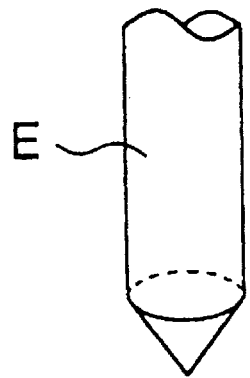
Figure 9:
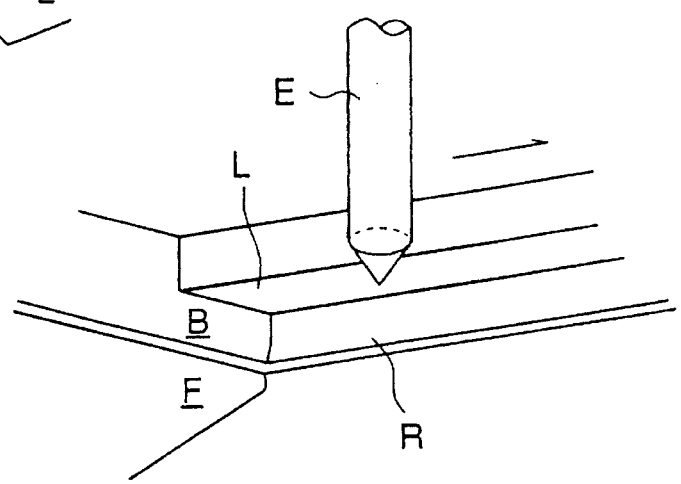
FIG. 9 is a perspective view showing how the stylus of a roughness tester works.
Figure 10:
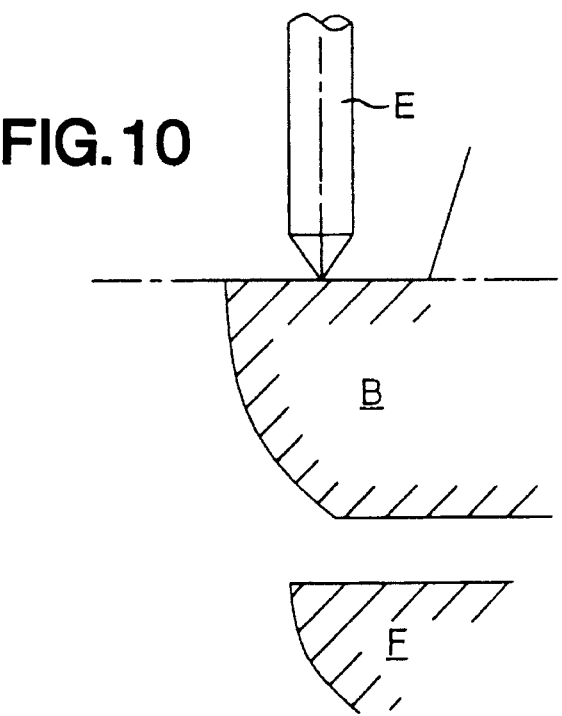
FIG. 10 is a sectional view showing how the stylus of a roughness tester works.

When measuring surface L that follows the edge at the downstream side on the back bar, a stylus whose bottom circle has a diameter of 2 mm as shown in FIG. 6(B) was used and the aforementioned surface roughness tester was set so that the surface L may be horizontal as shown in FIGS. 9 and 10. Then, the surface roughness on each of spots being 1.0 mm, 1.5 mm and 2.0 mm away from intersecting point K was measured 6 times by 75 mm overall the width in the lateral direction of the support. In this case, assuming that cut-off is 0.25 mm, with regard to Ra, its value was obtained as the mean value of the measurements, and with regard to Rmax, its value was obtained as the maximum value of them.

Table 1 shows the results of experiments made by the use of a single layer extrusion coater, while Table 2 shows the results of experiments made by the use of a multi-layer extrusion coater. In the experiments, a coating speed was 300 m/min, and when a single layer extrusion coater was used, a thickness of wet coating layer was 3 µm, while when a multilayer extrusion coater was used, a thickness of upper wet coating layer was 3 µm and that of lower wet coating layer was 7 µm, and with regard to angle θ formed between tangential line T' and support S the experiments were conducted on two conditions of +5° and −5°.

From Table 1 and Table 2, it is understood that uneven and nonuniform coating influences so as to deteriorate C/N ratios. Therefore, it is also understood that it is effective for an improvement of C/N ratios and further for prevention of streak defects that Ra on an edge at the downstream side on the back bar is not larger than 0.5 µm and Rmax is not larger than 6.0 µm.

In particular, when Ra is not larger than 0.35 µm and Rmax is not larger than 4.0 µm as shown in examples 1-1-1-8, the streak defect is not observed at all and it is shown that C/N ratios have been improved. Furthermore, when Ra is not larger than 0.10 µm and Rmax is not larger than 1.2 µm as shown in examples 1-1-1-3, neither uneven and nonuniform coating layer nor deterioration of C/N ratios is observed, which shows that extremely excellent coating can be carried out.

Next, when observing the results of experiments made under the condition of θ=−5°, apparent differences in the number of uneven and nonuniform coating, in the number of streak defects and in C/N ratios are observed with a border line where Ra on the edge at the downstream side on the back bar is not larger than 0.5 µm and Rmax is not larger than µm, and it is understood that the Ra and Rmax are effective for an improvement, such the effects are also observed on the condition of θ=5°. When comparing the foregoing with the case wherein θ takes 5°, however, both uneven and non-uniform coating and streak defects show slightly worse values. Then, when Ra on surface L is made to be not larger than 5 µm and Rmax is made to be not larger than 6.0 µm, it is understood that the uneven and nonuniform coating and the streak defects can be improved.

When a coating apparatus of the invention is used, it is possible to bring out effectively a smoothing effect which is achieved by the back edge surface and thereby to prevent coating defects such as uneven and nonuniform coating and streak defects. Thus, it is possible to solve the problems mentioned at the beginning.

TABLE 1

| | Edge at the downstream side on back bar | | Surface L | | θ = 5 | | | θ = −5 | | |
|---|---|---|---|---|---|---|---|---|---|---|
| | | | | | Uneven and nonuniform | | | Uneven and nonuniform | | |
| | Ra | Rmax | Ra | Rmax | coating | Streaks | C/N | coating | Streaks | C/N |
| Example 1-1 | 0.06 | 0.92 | 0.05 | 0.84 | 0 | 0 | 0 | 0 | 0 | 0 |
| Example 1-2 | 0.09 | 1.10 | 0.07 | 0.98 | 0 | 0 | 0 | 0 | 0 | 0 |
| Example 1-3 | 0.10 | 1.12 | 0.09 | 1.23 | 0 | 0 | 0 | 0 | 0 | 0 |
| Example 1-4 | 0.13 | 1.21 | 0.15 | 1.40 | 2 | 0 | −0.1 | 2 | 0 | −0.1 |
| Example 1-5 | 0.18 | 1.30 | 0.28 | 2.81 | 2 | 0 | 0 | 2 | 0 | −0.1 |
| Example 1-6 | 0.23 | 2.51 | 0.33 | 3.63 | 2 | 0 | −0.1 | 2 | 0 | −0.1 |
| Example 1-7 | 0.26 | 3.00 | 0.35 | 4.23 | 2 | 0 | −0.1 | 2 | 0 | −0.1 |
| Example 1-8 | 0.32 | 3.81 | 0.41 | 5.55 | 2 | 0 | −0.1 | 4 | 0 | −0.1 |
| Example 1-9 | 0.380 | 4.10 | 0.47 | 5.91 | 4 | 1 | −0.2 | 4 | 1 | −0.2 |
| Example 1-10 | 0.38 | 4.51 | 0.35 | 6.18 | 4 | 1 | −0.2 | 4 | 6 | −0.3 |
| Example 1-11 | 0.44 | 5.28 | 0.57 | 5.77 | 6 | 2 | −0.2 | 10 | 2 | −0.7 |
| Example 1-12 | 0.41 | 4.63 | 0.53 | 6.21 | 4 | 1 | −0.2 | 10 | 6 | −0.7 |
| Example 1-13 | 0.44 | 5.30 | 0.59 | 6.81 | 6 | 2 | −0.2 | 10 | 9 | −0.7 |
| Example 1-14 | 0.48 | 5.84 | 0.71 | 7.54 | 6 | 3 | −0.2 | 14 | 9 | −0.8 |
| Comparative example 1-1 | 0.41 | 6.72 | 0.46 | 5.73 | 6 | 12 | −0.4 | 6 | 12 | −0.7 |
| Comparative example 1-2 | 0.54 | 5.38 | 0.43 | 5.09 | 24 | 3 | −1.3 | 24 | 4 | −1.3 |
| Comparative example 1-3 | 0.45 | 6.30 | 0.58 | 7.81 | 10 | 11 | −0.8 | 10 | 17 | −0.8 |
| Comparative example 1-4 | 0.47 | 6.81 | 0.78 | 5.88 | 10 | 13 | −0.8 | 28 | 13 | −1.5 |
| Comparative example 1-5 | 0.47 | 7.12 | 0.48 | 8.45 | 10 | 17 | −0.8 | 12 | 20 | −0.9 |
| Comparative example 1-6 | 0.67 | 6.70 | 0.90 | 9.13 | 28 | 14 | −1.5 | 32 | 23 | −1.9 |
| Comparative example 1-7 | 0.80 | 8.52 | 0.92 | 9.35 | 30 | 19 | −1.8 | 34 | 25 | −2.0 |

TABLE 2

| | Edge at the downstream side on back bar | | Surface L | | θ = 5 | | | θ = −5 | | |
|---|---|---|---|---|---|---|---|---|---|---|
| | | | | | Uneven and nonuniform | | | Uneven and nonuniform | | |
| | Ra | Rmax | Ra | Rmax | coating | Streaks | C/N | coating | Streaks | C/N |
| Example 2-1 | 0.05 | 0.81 | 0.06 | 0.83 | 0 | 0 | 0 | 0 | 0 | 0 |
| Example 2-2 | 0.07 | 1.00 | 0.07 | 0.95 | 0 | 0 | 0 | 0 | 0 | 0 |
| Example 2-3 | 0.09 | 1.18 | 0.10 | 1.09 | 0 | 0 | 0 | 0 | 0 | 0 |
| Example 2-4 | 0.12 | 1.22 | 0.18 | 1.21 | 2 | 0 | −0.1 | 2 | 0 | −0.1 |
| Example 2-5 | 0.23 | 2.12 | 0.21 | 2.68 | 2 | 0 | −0.1 | 2 | 0 | −0.1 |
| Example 2-6 | 0.35 | 3.70 | 0.43 | 4.67 | 2 | 0 | −0.1 | 2 | 0 | −0.1 |
| Example 2-7 | 0.37 | 4.11 | 0.48 | 6.14 | 4 | 1 | −0.1 | 4 | 8 | −0.2 |
| Example 2-8 | 0.41 | 4.38 | 0.54 | 4.44 | 4 | 1 | −0.1 | 10 | 2 | −0.7 |
| Example 2-9 | 0.45 | 5.03 | 0.60 | 6.38 | 4 | 0 | −0.2 | 10 | 7 | −0.8 |
| Example 2-10 | 0.50 | 5.98 | 0.67 | 7.30 | 6 | 3 | −0.2 | 12 | 10 | −0.8 |
| Comparative example 2-1 | 0.44 | 6.12 | 0.42 | 5.78 | 4 | 12 | −0.4 | 4 | 12 | −0.4 |
| Comparative example 2-2 | 0.46 | 6.31 | 0.45 | 6.51 | 4 | 14 | −0.4 | 4 | 17 | −0.4 |
| Comparative example 2-3 | 0.49 | 6.44 | 0.54 | 6.70 | 6 | 15 | −0.4 | 24 | 27 | −1.3 |
| Comparative example 2-4 | 0.51 | 7.01 | 0.43 | 5.10 | 18 | 17 | −1.0 | 18 | 18 | −1.0 |
| Comparative example 2-5 | 0.62 | 7.11 | 0.47 | 6.23 | 24 | 18 | −1.0 | 24 | 21 | −1.3 |
| Comparative example 2-6 | 0.70 | 8.00 | 0.64 | 7.36 | 28 | 20 | −1.5 | 30 | 29 | −1.7 |

What is claimed is:

1. An apparatus for coating a coating solution on a support member, the apparatus comprising:

at least two coating bars along which the support member is conveyed in a running direction, wherein at least one of the coating bars is a downstream bar located downstream in said running direction, the downstream bar having an upstream side and a downstream side opposite each other, wherein an edge is located at the downstream side of said downstream bar; and an extrusion outlet, located between the coating bars, for extruding the coating solution onto the support member, wherein a center line mean roughness (Ra) on the edge at the downstream side of the downstream bar is not larger than 0.5 μm and the maximum height ($R_{max}$) on the edge is not larger than 6.0 μm.

2. The apparatus of claim 1, wherein the center line mean roughness (Ra) is not larger than 0.35 μm.

3. The apparatus of claim 1, wherein the center line mean roughness (Ra) is not larger than 0.1 μm.

4. The apparatus of claim 1, wherein the maximum height (Rmax) is not larger than 4.0 μm.

5. The apparatus of claim 1, wherein the maximum height, (Rmax) is not larger than 1.2 μm.

6. The apparatus of claim 1, further comprising a surface continuing downstream from the edge at the downstream side of the downstream bar, wherein a center line mean roughness (Ra) on a portion of the surface located within 2.0 mm from the edge is not larger than 0.5 μm and the maximum height ($R_{max}$) on the portion is not larger than 6.0 μm.

7. The apparatus of claim 6, wherein the center line mean roughness (Ra) of the portion is not larger than 0.35 μm.

8. The apparatus of claim 6, wherein the center line mean roughness (Ra) of the portion is not larger than 0.1 μm.

* * * * *